United States Patent
Sagi

Patent Number: 5,216,902
Date of Patent: Jun. 8, 1993

[54] GIDEON BIKE PUMP LOCK

[76] Inventor: Gideon Sagi, 1409 Marina Circle, Davis, Calif. 95616

[21] Appl. No.: 915,264

[22] Filed: Jul. 20, 1992

[51] Int. Cl.⁵ .......................................... E05B 71/00
[52] U.S. Cl. .......................................... 70/39; 70/52; 70/58; 70/233
[58] Field of Search ............... 70/14, 38 R, 39, 57, 70/58, 52, 176, 179, 233, 258

[56] References Cited

U.S. PATENT DOCUMENTS

| | | | |
|---|---|---|---|
| 3,922,894 | 12/1975 | Johnson | 70/18 |
| 4,674,306 | 6/1987 | Halpern | 70/233 |
| 4,803,857 | 2/1989 | Hall et al. | 70/58 |

FOREIGN PATENT DOCUMENTS

| | | | |
|---|---|---|---|
| 81996 | 10/1956 | Denmark | 70/14 |
| 3035791 | 4/1982 | Fed. Rep. of Germany | 70/233 |
| 378686 | 2/1940 | Italy | 70/58 |
| 406598 | 12/1943 | Italy | 70/233 |
| 73052 | 2/1948 | Norway | 70/233 |
| WO91/08365 | 6/1991 | PCT Int'l Appl. | 70/58 |

*Primary Examiner*—Lloyd A. Gall
*Attorney, Agent, or Firm*—William S. Bernheim

[57] ABSTRACT

A device which serves the dual purpose of allowing locking or the bicycle to prevent theft and to allow inflation of a bicycle tire tube. The device includes a U-shaped shackle having its open end closed by a cross member which defines an air pump for inflating a bicycle tire.

4 Claims, 2 Drawing Sheets

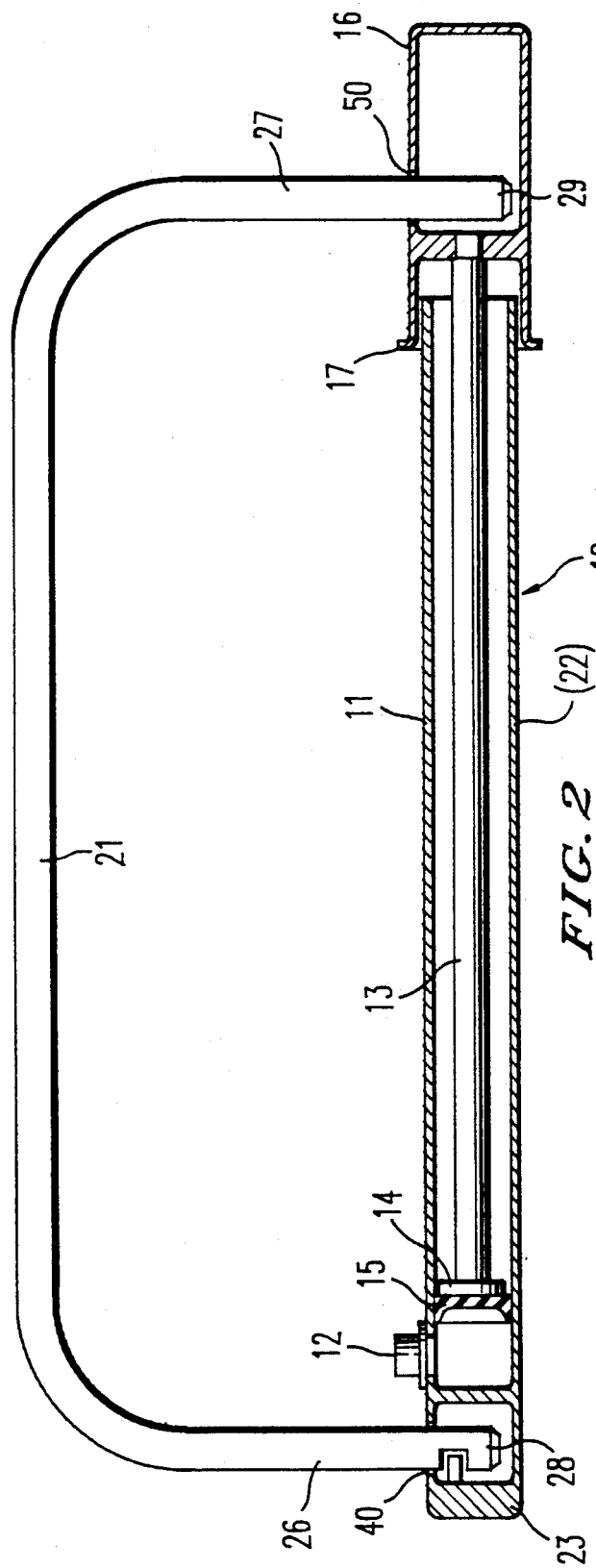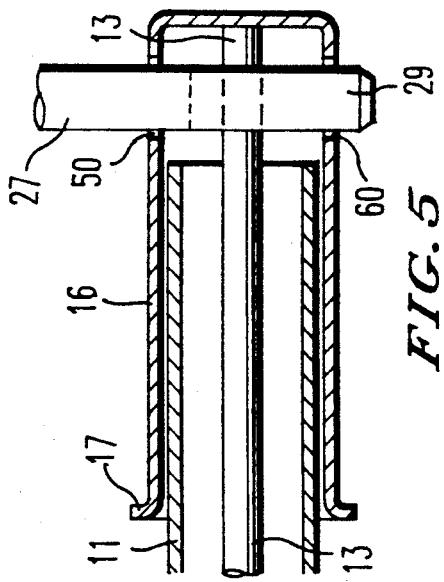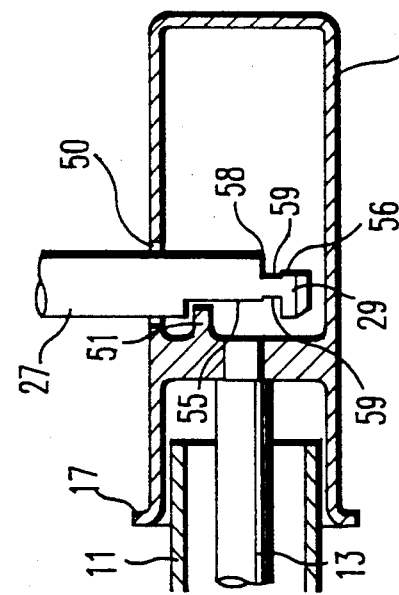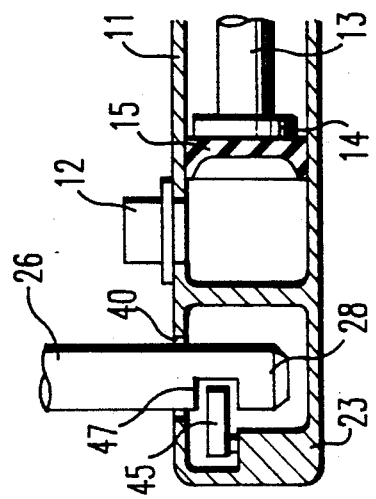

GIDEON BIKE PUMP LOCK

BACKGROUND OF THE INVENTION

1. Field of the Invention

The present invention relates generally to locking devices and air pumps for bicycles and more specifically to a device which serves the dual purpose of allowing locking of the bicycle to prevent theft and to allow inflation of a bicycle tire tube as needed.

2. Description of the Prior Art

Bicycles are popular for recreation and exercise. For people who ride long distances and climb hills, weight becomes of increasing importance. Typically, a rider carries an air pump so that after a flat the repaired or replacement tube can be inflated. The rider also carries a lock so that if the bicycle is to be left unattended, the bicycle can be locked to reduce the chances of theft.

The drawback of loading the bicycle with both an air pump and a lock on a bike is the added weight and use of space. These items are typically attached to the bicycle to an interior side of the frame triangle forward of the back wheel and behind the front wheel. This uses two of the sides of the triangle and leaves only one side for a water bottle. For traveling distances and hill climbing, the rider normally prefers and frequently needs two sides for mounting a bottle on each.

A popular lock incorporates a U-shaped member and a cross member which in the locked position crosses the open end of the U and contacts the two ends of the U-shaped member. A popular pump for carrying on a bike is a hand pump. Such pumps can be light weight but provide sufficient air pressure for the bicyclist to continue on his way after dealing with a flat. Another drawback, in addition to weight of and use of space, is the ease with which hand pumps can be stolen.

3. Statement of the Objects

Accordingly, it is an objective of the present invention to provide a device which can serve as a pump or a lock for a bicycle as needed.

Another objective is to provide a pump which can be locked to discourage theft.

Other objectives, advantages and novel features of the invention will become apparent to those skilled in the art upon examination of the invention and the accompanying drawings.

Summary of the Invention

BRIEF DESCRIPTION OF THE DRAWINGS

Further objectives and advantages of the invention will be apparent from the following detailed description, taken in conjunction with the accompanying drawings illustrating a preferred embodiment of the invention. The drawings are:

FIG. 2 is a side view not to scale of a combination lock and pump device according to the invention for use with a bicycle.

FIG. 3 is an enlarged cut away view not to scale of the valve cap end of device in accordance with the invention.

FIG. 4 is an enlarged cut away view not to scale of an alternative handle portion of the device in accordance with the invention.

FIG. 5 is an enlarged cut away view not to scale of a second alternative handle portion of the device in accordance with the invention.

DETAILED DESCRIPTION OF A PREFERRED EMBODIMENT

Figure 1:
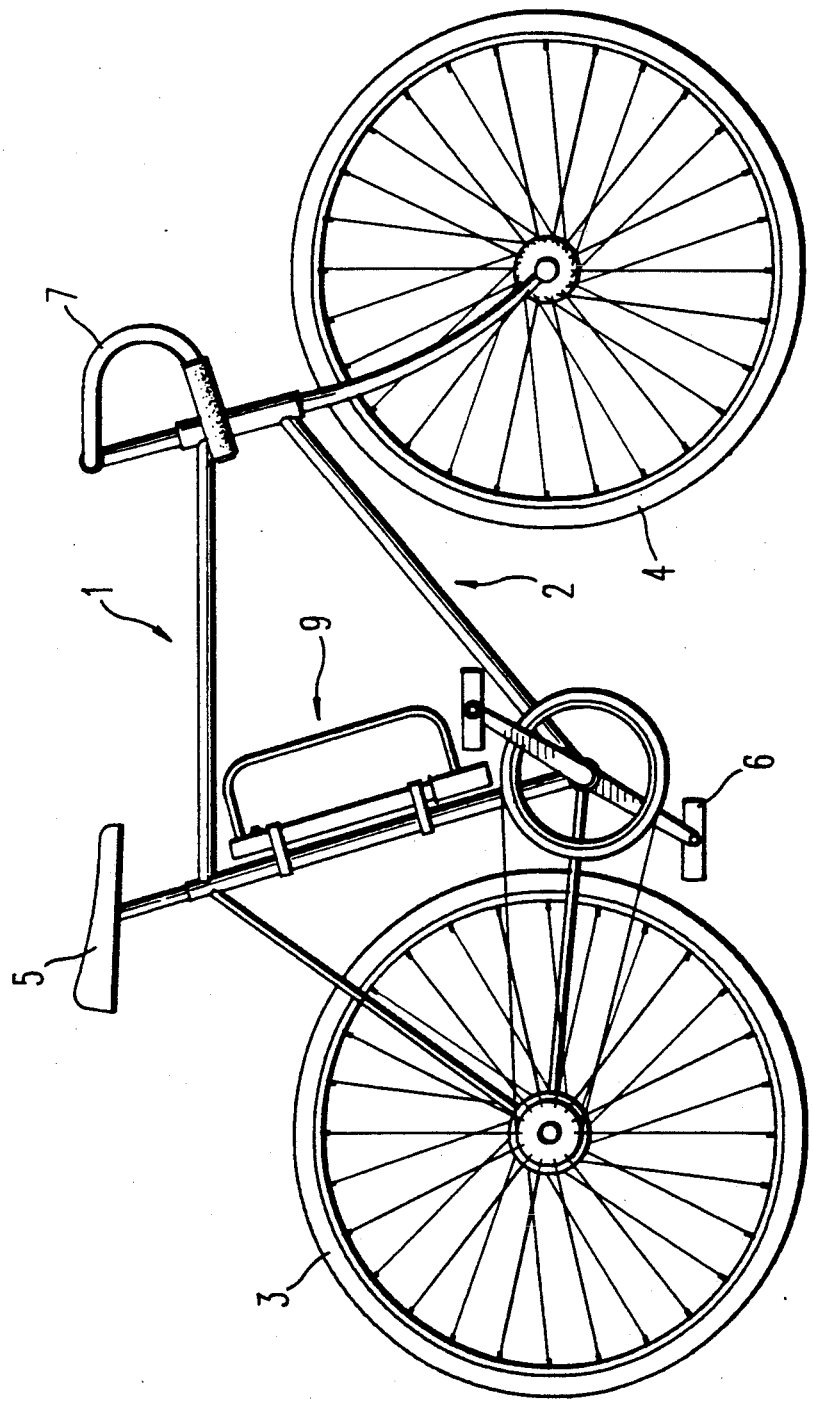
FIG. 1 is a side view not to scale of a bicycle.

FIG. 1 shows a typical bicycle 1 having a central triangular frame 2, wheels 3 and 4, seat 5, pedals 6 and handle bars 7.

FIG. 2 shows in more detail the inventive device 9 which is a combination air pump and lock. The device 9 can be attached to the frame 2 with spring clips or any other convenient means.

The pump 10 comprises a narrow barrel or cylinder 11 with an air valve cap 12 at one end. A piston rod 13 is adapted for reciprocal motion in the cylinder 11. One end of the rod 13 is fitted with a conventional combination piston 14 and piston packing 15. The piston packing is in air sealing contact with the interior of the cylinder 11. The other end of the rod is fitted with a handle 16 formed with an outwardly flared guard 17.

Handle 16 and rod 1 with piston 14 and piston packing 15 thereon are moved as a unit with a reciprocation motion within cylinder 11 to force air out of valve cap 12. Valve cap 12 is an operating cap for either a shrader valve or a presta valve. Tire tubes typically have one or the other of these valves. In the present invention, cap 12 is fitted to its corresponding valve and reciprocating motion of handle 16 forces air under pressure out of cap 12 into a tube mounted within a tire mounted as part of the bicycle wheel 3 or 4 through a corresponding tube valve.

Also shown in FIG. 2, a bicycle lock includes a U-shaped shackle 21, a cross member 22 and lock means 23. The U-shaped shackle 21 can be flattened to a D-shape as shown or be narrower. For different bikes different shapes may be Preferred. The pump 10 serves as the cross member 22. The U-shaped shackle 21 is made from a continuous metal bar preferably round and having an open end with two shackle ends 26 and 27. Shackle end 26 has a tip 28 and shackle end 27 has a tip 29. The cross member 22 is adapted to lock by use of the lock means 23 to the shackle 21 across the open end thereof for closing the open end of shackle 21 by insertion of shackle ends 26 and 27 into the cross member 22.

As shown in FIG. 3, at the cap 12 end of the cylinder 11, a locking hole 40 is located. Adjacent locking hole 40 is a locking means 23 which can be operated by key or combination. Shackle end 26 can be inserted in locking hole 40 and secured therein by engagement of the locking means 23. The locking means 23 includes a movably mounted locking rod 45. Spaced from the tip 29 of the shackle end 27 is an engagement slot 47 which is a recessed area extending along the shackle end 26. In operation, the locking rod 45 acts in concert with the engagement slot 47 to secure the shackle end 26 in locking hole 40.

As shown in FIG. 2, at the other end of the pump 10 from the cap 12, the handle 16 includes a latching hole 50 to accept insertion of shackle end 27. In a preferred embodiment shackle end 27 is a simple rod which slides into cylindrical latching hole 50. There is no locking action between the shackle end 27 and hole 50.

For operation cross member 22 is detached from U shaped shackle 21. The shackle 21 is then positioned to encompass a side of the triangular frame 2 plus the rim of one wheel or a stationary object such as tubing of a bike rack or post of a parking meter. The cross member 22 is then positioned so that shackle end 27 is inserted into latching hole 50 and shackle end 26 is inserted into locking hole 40 and the locking means 23 used to engage locking rod 45 with engagement slot 47.

FIG. 4 is an alternative embodiment for shackle end 27 which Provides for additional theft protection by requiring rotation of the shackle end before it can be removed entirely from latching hole 50. Inside the handle 16 adjacent the latching hole 50 is a securing rod 51. The shackle end 27 includes a locking slot 55 which is a recessed area spaced from the tip 29 along the length on the side nearest the other shackle end 26, an open slot 56 extends inward from the tip 29 of shackle end 27 on the opposite side from the slot 55 and includes end wall 58, and a race 59 encompassing the remaining circumference of the shackle 21 to join the locking slot 55 with open slot 56 about the circumference of shackle 21.

In operation of the alternative embodiment, the U-shaped shackle 21 is first attached to the cross member 22, which is the pump 10, by having the U-shaped shackle 21 positioned so that shackle end 27 can be inserted into the latching hole 50. Properly positioned the open slot 56 allows the shackle end 27 to slide inside the handle 16 past the securing rod 51. Shackle end 27 is inserted until the end wall 58 of the open slot 56 contacts the securing rod 51 at which time the U-shaped shackle 21 is rotated at least 90° degrees and preferably about 180° with the securing rod 51 moving along the race 59 until the shackle end 26 is over the locking hole 40.

At this point the securing rod 51 is engaged with the locking slot 55. Engagement of the rod 51 with the locking slot 55 prevents the removal of the shackle end 27 from the handle 16 and allows further insertion of the shackle end 27 into the handle 16.

As end 27 is moved further into the handle 16, end 26 is inserted into locking hole 40. Preferably, locking rod 45 is spring loaded so when the locking means 23 is unlocked the locking rod 45 is pushed out of the way by end 27 until the engagement slot 47 is reached. The locking rod 45 springs into the engagement slot 47. At this point, the locking means 23 can be locked to prevent further movement of the locking rod 45.

In FIG. 5, a second alternative for handle 16 is shown. In this alternative the shackle end 27 when locked in place extends through the handle and out a second latching hole 60. The rod 13 extends to the far end of the handle 16. The shackle end 27 can have a slit to allow the end 29 to pass past the rod 13 or the rod can be a plate at the location with a hole therethrough which lines up with the latching hole 50 and second latching hole 60. These alternatives can be used to improve handle stability and reduce the chance of the lock being pried open.

It should also be appreciated that in the locked mode the shackle 21 prevents movement of the handle 16 so as to prevent use of the pump 10 and thus discourages theft. Further when the locked mode is used to secure the bicycle to a location, the pump 10 is also locked to the bicycle.

I claim:

1. A combination lock and pump device for bicycles the device comprising:
    (a) a U-shaped shackle made from a bar having an open end;
    (b) a cross member adapted to lock to said shackle across the open end thereof for closing said shackle;
    (c) the cross member further comprising a locking means, a cylinder of an air pump and a rod reciprocally mounted to move within the cylinder;
    (d) a handle attached at one end to the rod to facilitate movement thereof;
    (e) a piston and piston Packing attached at the opposite end of the rod and the piston packing in sealing contact with the cylinder.

2. The device of claim 1 wherein the shackle has two shackle ends and the handle includes a latching slot to accept one of the shackle ends.

3. The device of claim 1 wherein the shackle has two shackle ends and the cylinder includes an end having an air valve and a locking hole to accept one of the shackle ends.

4. The device of claim 3 further comprising a locking mechanism located at the locking hole to selectively hold one of the shackle ends in place.

* * * * *